United States Patent [19]

Cash

[11] Patent Number: 4,509,052
[45] Date of Patent: Apr. 2, 1985

[54] RF INTERFEROMETER/DOPPLER TARGET LOCATION SYSTEM

[75] Inventor: Carlton H. Cash, Marietta, Ga.

[73] Assignee: Georgia Tech Research Institute, Atlanta, Ga.

[21] Appl. No.: 489,101

[22] Filed: Apr. 27, 1983

[51] Int. Cl.³ .............................................. G01S 5/02
[52] U.S. Cl. .................................. 343/418; 343/424; 343/445
[58] Field of Search ............... 343/394, 402, 405, 418, 343/424, 442, 445

[56] References Cited

U.S. PATENT DOCUMENTS

| | | | |
|---|---|---|---|
| 4,136,342 | 6/1979 | Alcock et al. | 343/424 |
| 4,321,601 | 3/1982 | Richman | 343/5 CM |
| 4,387,376 | 6/1983 | Sherrill et al. | 343/424 |

*Primary Examiner*—Theodore M. Blum

*Attorney, Agent, or Firm*—Newton, Hopkins & Ormsby

[57] ABSTRACT

A radio frequency interferometer/Doppler target location system comprising in one embodiment a wave source on a target vehicle which is tracked by a radio frequency interferometer located at a known situs. The radio frequency interferometer generates signals representing the azimuth angle, elevational angle and Doppler shift of the source. The Doppler shift is a direct measurement of the velocity of the target vehicle in wavelengths per second and therefore if the Doppler cycles are counted from the time the target vehicle is launched, its range can be determined at any desired time. The azimuth angle signal, elevation angle signal and the Doppler shift signal are then transmitted to a processor where the information is converted into any desired format to indicate the position of the tracked vehicle.

16 Claims, 13 Drawing Figures

Simple target location processor.

FIG. 10

Simple target velocity vector processor.

RF INTERFEROMETER/DOPPLER TARGET LOCATION SYSTEM

BACKGROUND OF THE INVENTION

1. Field of the Invention

The present invention relates to a radio frequency (hereinafter referred to as RF) interferometer/Doppler target location system which is used to determine the location in space or track vehicles or targets, and to determine the velocity vectors of the same.

2. Description of the Prior Art

Present methods of locating and tracking vehicles or targets utilize active radar with tracking antennas, while Doppler radar is used to determine the relative velocity of the vehicle or targets. Attendant to these present methods are many disadvantages such as the requirement of high power radiation and large prime power. Further, short pulses, very high power, wide band width receivers, large monopulse antennas and complex signal processing are required for accurate location and tracking. This results in systems which are highly complex, with correspondingly high costs of manufacture. Radar is also very susceptible to antiradiation missiles and location systems.

The present invention ameliorates the aforesaid disadvantages of monopulse radar devices and provides an RF interferometer/Doppler target location system which requires lower prime power, which is not susceptible to anti-radiation missiles, which is much less complex, resulting in a much lower cost. Further, the nature of the system is such that very simple antennas may be used. The accuracy of the system being independent of the antenna beamwidth allows for much greater angle accuracy associated with fixed beamwidths and antenna scanning becomes unnecessary. Finally, the system can be easily constructed using a simple receiver of IF and/or Doppler amplifiers and a signal processor, without the necessity of monopulse hybrids.

SUMMARY OF THE INVENTION

Accordingly, one object of this invention is to provide a novel RF interferometer/Doppler target location system which determines the location in space of vehicles or targets.

It is another object of this invention to provide a novel RF interferometer/Doppler target location system which determines the velocity vectors of the vehicles or targets.

It is yet another object of this invention to provide a novel RF interferometer/Doppler target location system which tracks a moving vehicle or target in azimuth angle, elevation angle and Doppler shift throughout the trajectory of the same in order to continually determine the location of the moving vehicle or target.

It is still yet another object of the present invention to provide a novel RF interferometer/Doppler target location system which utilizes a simple antenna configuration and fixed beamwidths to improve the angle accuracy and without requiring an antenna scan.

It is a further object of the present invention to provide a novel RF interferometer/Doppler target location system which utilizes a simple receiver including IF and/or Doppler amplifiers and a simple processor to determine the location and/or track vehicles, thus eliminating the necessity of complex monopulse hybrids.

In order to accomplish the aforementioned objects, the present invention provides in one embodiment for mounting a simple transmitting RF, microwave, or millimeter wave source on a target such as a missile, rocket, projectile or aircraft. The source is then tracked by an RF interferometer located at the launch site in azimuth angle, elevational angle and in Doppler shift when the target is launched and throughout the target trajectory. The Doppler shift is a direct measurement of the target velocity in wavelengths per second. Therefore, if the Doppler cycles are counted from the time of launch ($t_0$) to any later time (t), the target range may be determined at time (t) to within one wavelength of the RF signal. The target with the transmitting source can therefore be tracked and located in space at any time (t) relative to the launch position. The azimuth angle signal, elevation angle signal and the Doppler shift signal may then be transmitted to a processor where the information is converted into any desired format to indicate the position of the tracked vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
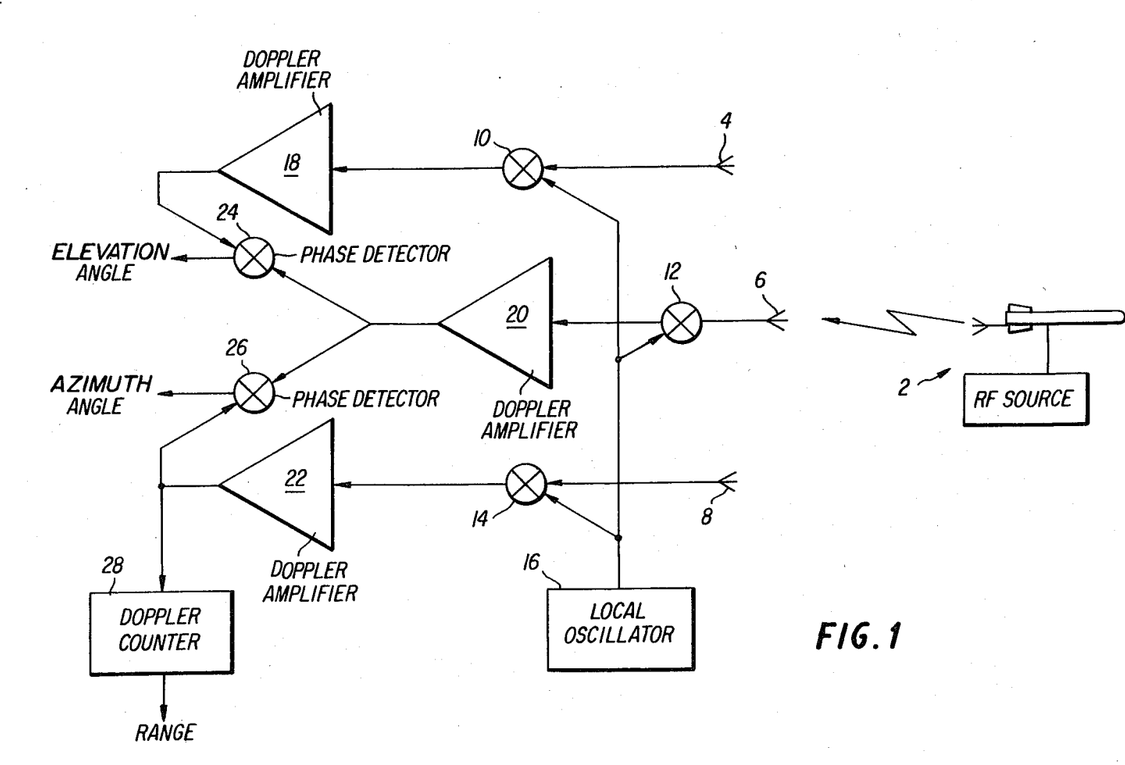
FIG. 1 is a circuit diagram of one embodiment of the present invention.
Figure 2:
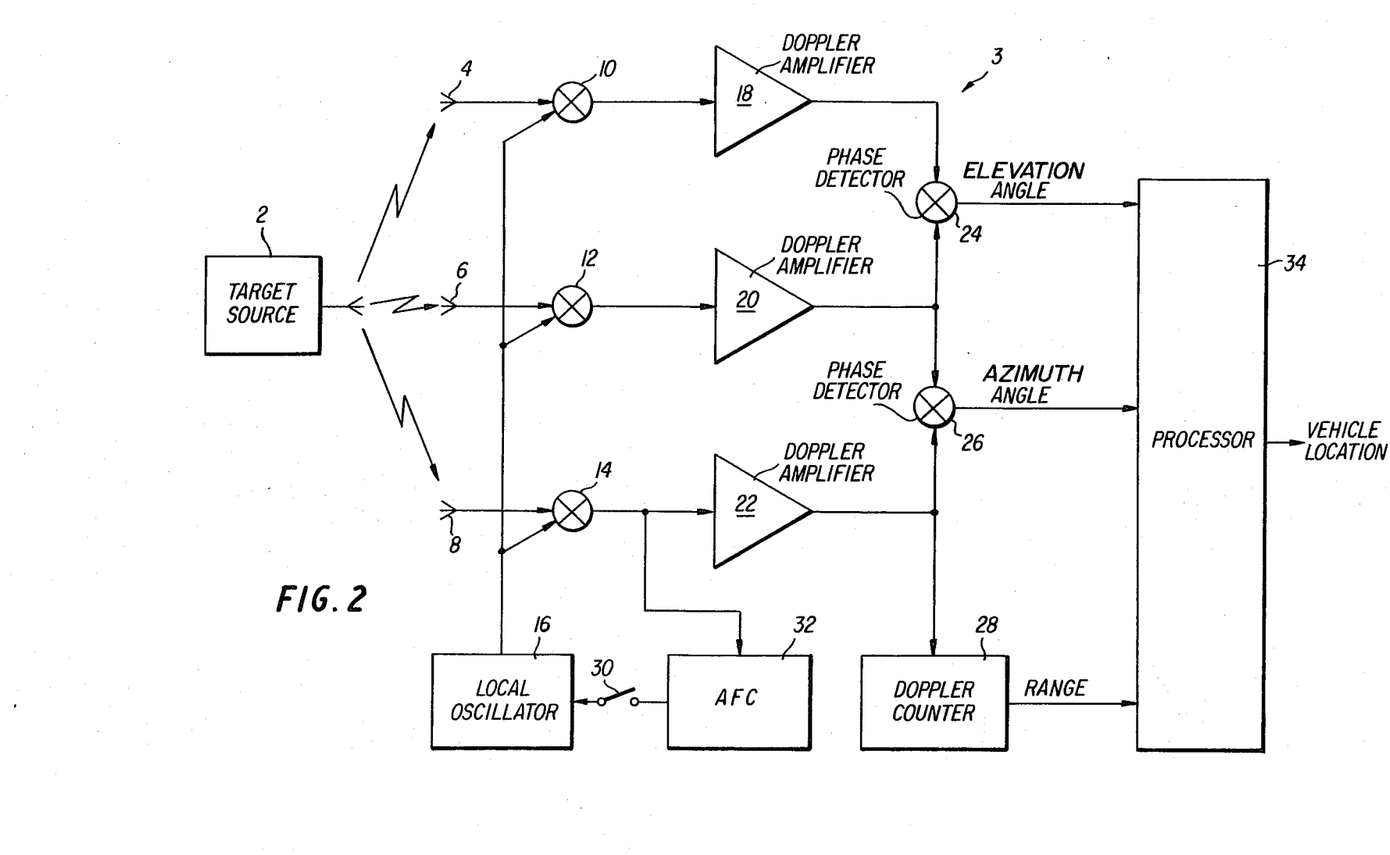
FIG. 2 is a circuit diagram of another embodiment of the present invention.

Referring now to the drawings, wherein like reference numerals designate identical or corresponding parts throughout the several views, and more particularly to FIG. 1 thereof, the circuit diagram of one embodiment of the present invention is shown. The present invention includes an RF source to be connected to a launched vehicle for example, at least three receiving antennas 4, 6 and 8 connected to respective mixers 10, 12 and 14 which are also fed by the local oscillator 16. The mixers 10, 12 and 14 are connected to the respective Doppler amplifiers 18, 20 and 22; the outputs of the Doppler amplifiers 18 and 20 being connected to the phase detector 24, while the outputs of the Doppler amplifiers 20 and 22 are connected to the inputs of the phase detector 26. A Doppler counter or integrator 28 is connected to the output of the Doppler amplifier 22 in order to determine the range of the RF source 2. The output of the phase detector 24 represents the elevation angle of the RF source, while the output of the phase detector 26 represents the azimuth angle of the RF source 2. The embodiment of FIG. 2 is essentially the same as that of FIG. 1, except that the circuit 3 includes an automatic frequency control circuit 32 connected to the output of the mixer 14 and has its output connected to the local oscillator 16 through a switch 30. Further, the embodiment of FIG. 2 also includes a processor 34, such as a computer which can be used to present the range and orthogonal angle information in any desired coordinate system and data format. It should be noted that for the circuit of FIG. 1, the local oscillator and the target source 2 will be manually tuned to the same frequency prior to launch, whereas in FIG. 2 the automatic frequency control circuit 32 will keep the local oscillator 16 and target source 2 automatically tuned to the same frequency.

Figures 4, 5A, 6:
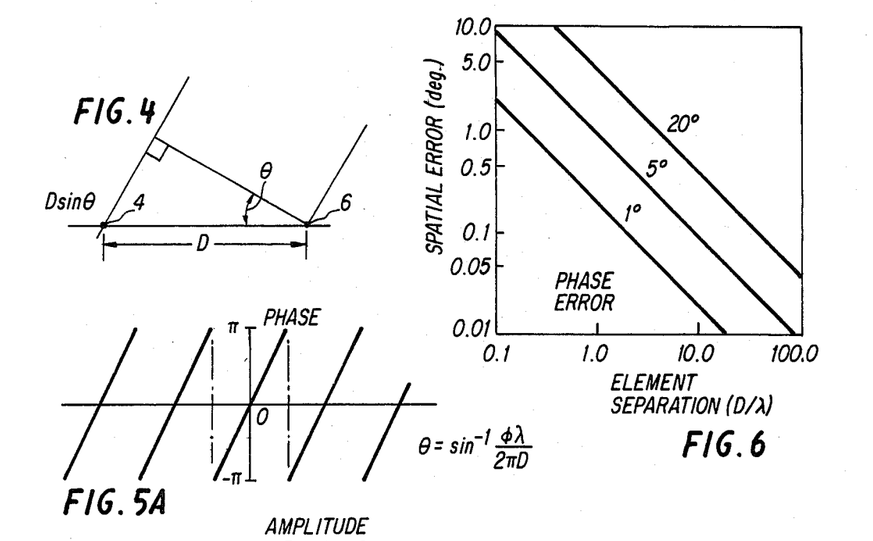
FIG. 4 is a diagram illustrating the geometrical relationship of a two-element interferometer according to the present invention.
FIG. 5A is a graph illustrating the electrical phase angle relationship of the two-element interferometer of FIG. 4.
FIG. 6 is a graph illustrating the interferometer spatial error as a function of element spacing for several values of electrical phase error.

Normally, the RF interferometer comprises at least two antenna elements spaced along a line. The amplitude and phase of the output from the antenna element is a function of the off-bore-sight angle of signals received from a radiating source and the elements spacing, D, as shown in the two element interferometer of FIG. 4. The normalized output of such an interferometer is $$E(\theta) = 1 - e^{-j\phi}, \quad (1)$$

where the phase angle, $\phi$, is a function of the element spacing, D. The plane-wave incidence angle, $\theta$, is given by $$\phi = \frac{2\pi D}{\lambda} \sin \theta. \quad (2)$$

Nulls in the pattern occur when $$\frac{2\pi D}{\lambda} \sin \theta \times \pm N(2\pi) \quad (3)$$

or, conversely, when $$\theta = \pm \sin^{-1}\left(\frac{N\lambda}{D}\right). \quad (4)$$

Figure 5B:
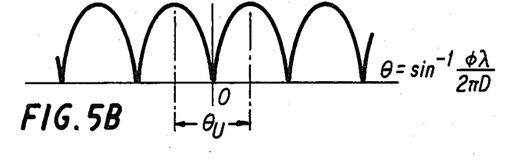
FIG. 5B is a graph illustrating the spatial amplitude pattern for the two-element interferometer of FIG. 4.

The electrical phase angle and resulting spatial amplitude pattern for such a two-element interferometer are shown in FIGS. 5A and 5B, respectively. The spatial angle, $\theta$, is unambiguous over the angular region of width $\theta_u$, where $$\theta_u = 2 \sin^{-1}\left(\frac{\lambda}{2D}\right). \quad (5)$$

The unambiguous region for typical values of $D/\lambda$ is relatively narrow, as shown in the following table.

| $D/\lambda$ | $\theta_u$ |
| --- | --- |
| 2 | 29.0° |
| 5 | 11.5° |
| 10 | 5.7° |
| 20 | 2.85° |

The relationship between phase angle errors in the interferometer, $\Delta\phi$, and spatial angle errors at the interferometer output, $\Delta\theta$, may be derived by simple differentiation. At boresight, the relationship is $$\Delta\theta = \frac{\Delta\phi}{2\pi(D/\lambda)}. \quad (6)$$

Referring now to FIG. 6, the spatial error, $\Delta\theta$, is shown plotted as a function of the interferometer element spacing for several values of electrical phase error. At X-band, for example, for an interferometer element spacing of 24 inches ($D/\lambda = 20$) and a 5° phase error, the resulting spatial error will be less than 1 milliradian.

Figure 3:
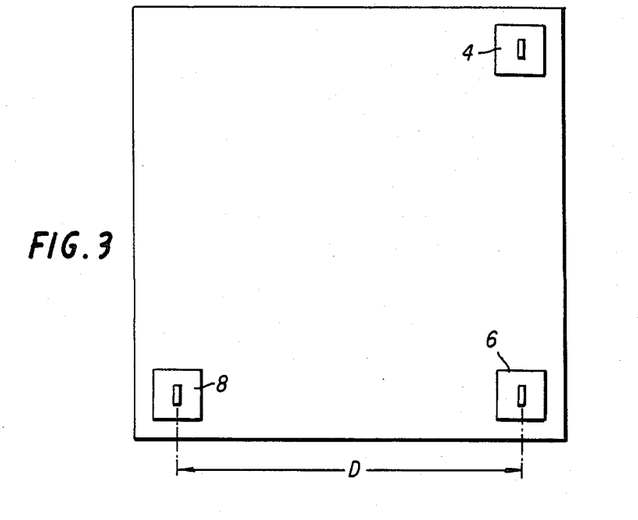
FIG. 3 is a diagram illustrating the antenna layout for one embodiment of the present invention.

With the above-mentioned theory in mind, the operation of one embodiment of the present invention may be easily understood by referring to FIGS. 2 and 3. In order to simultaneously measure the azimuth and elevation angle to the radiating source, two orthagonal interferometers are required. This may be accomplished by using three antennas on two orthogonal baselines as illustrated in FIG. 3. The antennas 6 and 8 are on a baseline parallel to the surface of the earth and are used in order that the interferometer can measure the azimuth angle to the target source 2, while the antennas 4 and 6 are in a baseline perpendicular to the surface of the earth in order that the elevation angle of the target source 2 may be measured by the interferometer. Referring again to FIG. 2, an interferometer circuit configuration using the three antennas 4, 6 and 8 of FIG. 3 is illustrated. The target source 2 generates an RF output signal which is received by the three antennas 4, 6 and 8, the output of each being fed to the respective mixers 10, 12 and 14. The output from the local oscillator 16 is fed into each of the mixers 10, 12 and 14 in order that the input signals from the antennas will be heterodyned to the base band. The automatic frequency control 32 tunes the local oscillator 16 to the frequency of the target source 2 whenever the switch 30 is closed. When the vehicle carrying the target source 2 is launched, the switch 30 is opened and the local oscillator remains at the frequency of the target source 2 throughout the trajectory of the target source 2. The frequency of the signal received from the source 2 at antennas 4, 6 and 8 is shifted due to the doppler effect. The outputs of the mixers 10, 12 and 14 are each at a doppler frequency which is directly proportional to the velocity of the target source and are amplified by the respective Doppler amplifiers 18, 20 and 22 to provide proper level inputs to the phase detectors 24, 26 and to the Doppler counter or integrator 28. A cycle of Doppler will be generated when the target source 2 moves through a distance of one wavelength. Therefore by counting the Doppler cycles, a direct measurement of the range to the target source 2 in wavelengths of the target source 2 in the local oscillator is obtained. The range measurement can be converted to any desired units by the processor 34.

Again referring to FIGS. 2 and 3, the baseline between the antennas 4 and 6 is in a plane perpendicular to the earth's surface. The outputs from the Doppler amplifiers 18 and 20 are the inputs to the phase detector 24. The phase angle of the output from the phase detector 24 represents the elevation angle in electrical degrees and is related to the spatial elevation angle by equation 4 which was referred to earlier. Again, the electrical phase angle can be converted to any desired unit by the processor 34.

The baseline between antennas 6 and 8 is in a plane parallel to the earth's surface. The outputs from Doppler amplifiers 20 and 22 are the inputs to the phase detector 26. The phase angle of the output from the phase detector 26 represents the azimuth angle and can be converted to any desired unit by the processor 34.

For the above embodiment, for example, assume the antenna 4, 6 and 8 to be horn antennas which are 1.5×1.5 centimeters for a 12° pencil beamwidth at 60 $GH_z$. At a frequency of 60 gigahertz the wavelength is 5 millimeters and for a $D/\lambda=20$ the spacing is 10 centimeters. Such a configuration provides a gain of approximately 23 dB. At 10 gigahertz the spacing would be 60 centimeters and the horn size would be 9 centimeters by 9 centimeters. These parameters will provide for accurate location of a vehicle within the 12° beamwidths. The location space can be reduced or expanded as desired by changing the system antenna beamwidths without loss of location accuracy. The 60 gigahertz and Doppler cycle counter provide an inherent range accuracy of 4 millimeters provided the local oscillator and the vehicle mounted source are stable. This inherent range accuracy will be degraded to 0.3 meters at 1 megahertz and to 3 meters at 100 megahertz.

The relative range and orthogonal angles (azimuth and elevation) measured as discussed above provide the location of the target source 2 relative to the situs of the interferometer in polar coordinates. If the position of the interferometer in space is known, then the position of the target source 2 in space can be calculated by the processor 34 and presented in any desired coordinate system and data format.

The position of the receiving interferometer can be determined in several ways. In the case of a stationary receiving interferometer, a geodetic survey of its position can be made or it can be positioned at a known location. When the receiver interferometer is on a moving platform such as an aircraft or land vehicle, the range and orthogonal angle measurements provide a direct measurement of the relative location of the target source 2 with respect to the receiving interferometer. However, in order to locate the target source 2 in space an accurate navigation system for the radio interferometer platform is required. The processor 34 will then combine the changing receiving inferometer platform position with the measured relative target source 2-receiving interferometer position to calculate the position of the target source 2 in space.

As a result a moving target source 2 can be dynamically tracked in range, azimuth angle and elevation angle. In order to determine the velocity vector of the target source 2, the range rate and two orthogonal angle rates must be determined. One method to determine the range rate and orthogonal angle rates is done by measuring the Doppler to get the range vector and then simply differentiating the orthoganal angle rates to get angle vectors. The total velocity vector in space is then the vector summation of the three orthogonal velocity vectors.

It should be noted that the target source 2 of FIGS. 1 or 2 can be positioned at a known fixed location and that the radio frequency interferometer circuit may be mounted on a moving vehicle such as aircraft or land vehicle. Relative range and/or orthagonal angles will then be measured in exactly the same manner discussed above for a stationary interferometer and a moving target source 2. The output from the processor 34 will then be the location of the aircraft or land vehicle on which the interferometer is mounted.

It should further be noted that where both the RF interferometer/Doppler receiver and the RF source are moving, an independent means of determining the movement of at least one is required to determine the location of either of the vehicles. This is easily accomplished by implementing a separate stationary source and measuring the range and angle to the stationary source with the moving RF interferometer/Doppler receiver and source. Thus, in this manner the position in space of both vehicles can be determined.

Referring to FIG. 1, it should be noted that the interferometer circuit is almost the same as the circuit of FIG. 2 except that it does not contain an automatic frequency control circuit 32, switch 30 or the processor 34 and that the target source is illustrated as being mounted on a missile or rocket. In this configuration, the range, azimuth angle and elevation angle would be sent to a computer device such as a weapon fire control computer and compared to the predicted flight profile (ballistic, trajectory) that is computed and used to aim the rocket prior to firing. Deviations of the actual measured trajectory from the computed or predicted trajectory are then used to change the aim of subsequent rounds to increase the accuracy of the required trajectory.

Figure 7:
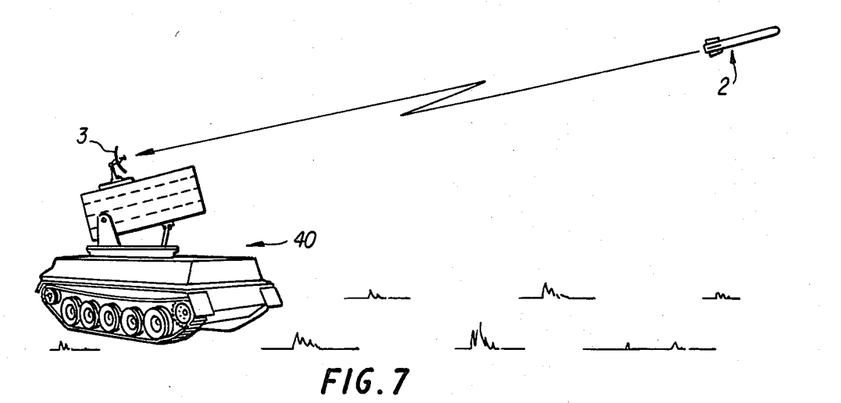
FIG. 7 is an illustration of a dynamically aimed free-flight rocket utilizing the system of the present invention.

Referring now to FIG. 7 an application of the present invention to a dynamically aimed free flight rocket is illustrated. In this embodiment the first rocket fired can be tracked in its position and velocity vector which is measured to determine the deviation of the trajectory from its predicted (ballistic) trajectory. The aim of the launcher is then changed to provide much better accuracy for subsequent rocket rounds. The subsequent rounds can also be tracked to provide accurate predicted impact accuracy and to provide increased aiming accuracy.

Figure 8:
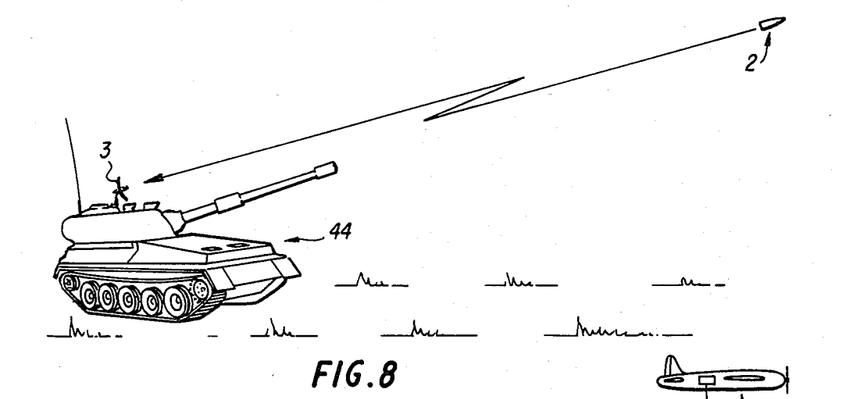
FIG. 8 is an illustration of a command adjusted trajectory device utilizing the system of the present invention.

FIG. 8 illustrates the radio frequency interferometer circuit 3 mounted on a self-propelled gun 44 and the radio frequency source 2 mounted on a projectile. The trajectory is measured by the radio frequency interferometer circuit 3 and compared to the predicted trajectory in a computer such as a fire control computer. A receiver and a directional control system may also be incorporated in the rocket or projectile of FIGS. 7 and 8 so that a command signal can be transmitted to correct the respective trajectories while in flight, thus implementing a command guided missile or command guided projectile.

Figure 9:
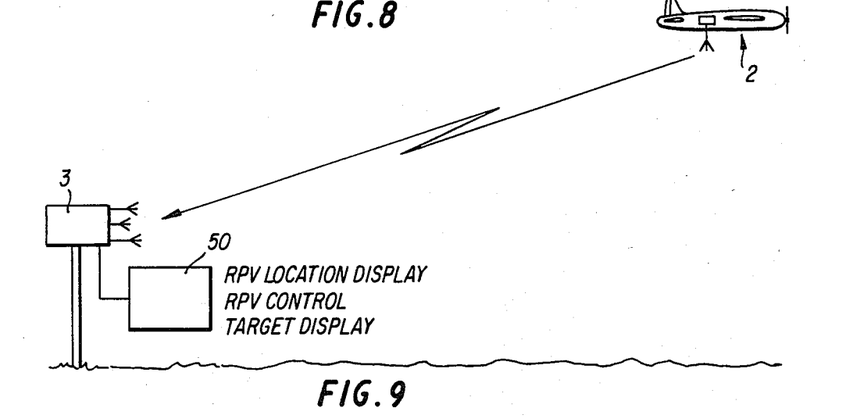
FIG. 9 is an illustration of a remotely piloted vehicle utilizing the present invention.

Now referring to FIG. 9, another use of the present invention is illustrated to track a remotely piloted vehicle (hereinafter referred to as RPV). The radio frequency interferometer circuit 3 is used in the manner described in FIG. 2 to determine the location information which is then formatted and displayed on the RPV location display and RPV control target display device 50 so that an operator can change the RPV flight path as desired through an RPV control system.

Figures 10, 11:
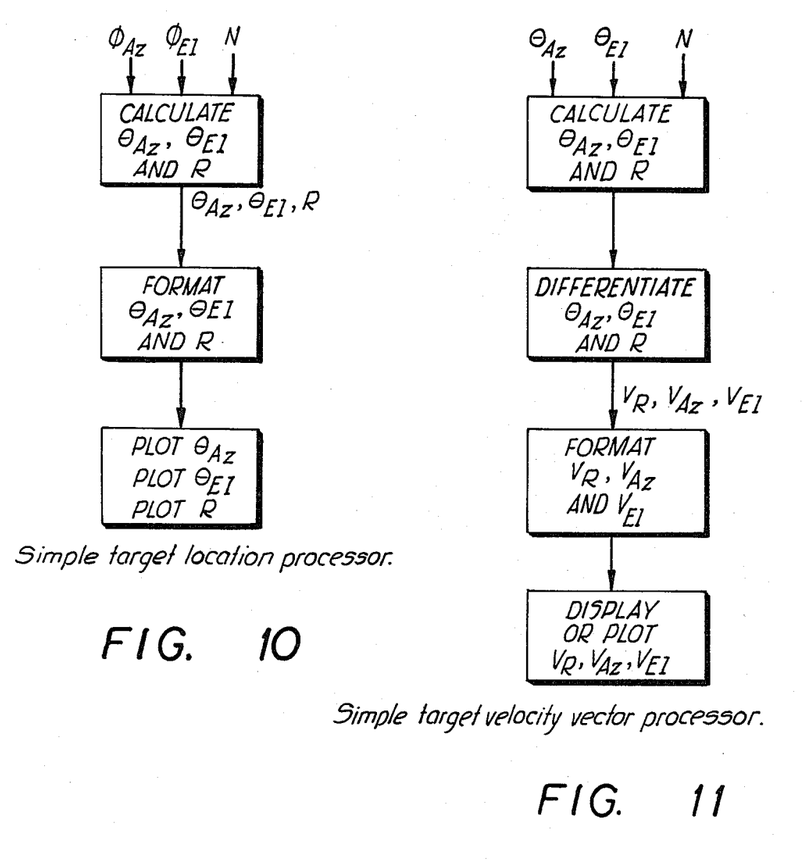
FIG. 10 is a flow chart illustrating a simple target location processor.
FIG. 11 is a flow chart illustrating a simple target velocity processor.

The processor 34 of FIG. 2 in a simple form is represented by the flow chart of FIG. 10.

The azimuth angle and elevation angle are calculated from Equation 2 where:

$$\text{output of Mixer 26} = \phi_{Az} = \frac{2\pi D}{\lambda} \sin \theta_{Az}$$

$$\text{output of Mixer 24} = \phi_{E1} = \frac{2\pi D}{\lambda} \sin \theta_{E1}$$

Range is calculated from the number, N, of Doppler cycles output of Doppler counter 28.

$$R = N\lambda.$$

The output in this case is a simple plot of the measured trajectory in azimuth angle, elevation angle, and range. It can easily be seen that the measured angle and range positions can be compared to the predicted ballistic positions for a projectile or rocket and that new aiming can be implemented to correct deviations.

The flow chart of FIG. 11 illustrates the calculation and plot or display of the target or vehicle velocity vectors.

Figure 12:
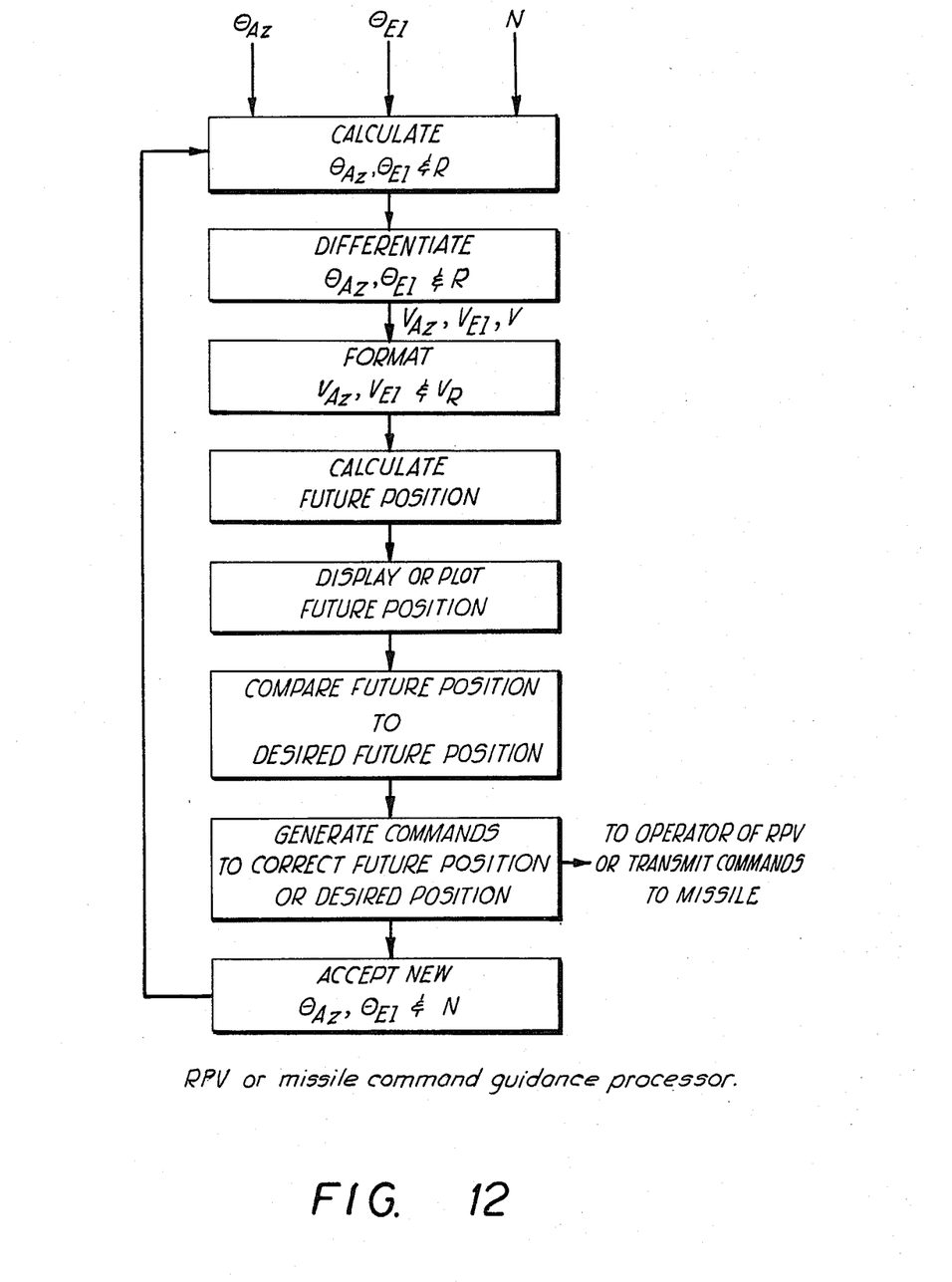
FIG. 12 is a flow chart illustrating a RPV or missile command guidance processor.

The flow chart of FIG. 12 illustrates a processor for the use of the measured velocity vectors to generate a closed loop command guidance for a Remotely Piloted Vehicle or Command Guided Missile.

Obviously, numerous (additional) modifications and variations of the present invention are possible in light of the above teachings. It is therefore to be understood that within the scope of the appended claims, the invention may be practiced otherwise than is specifically described herein.

What is claimed as new and is intended to be secured by Letters Patent is:

1. A target location system, having a combination of an RF interferometer and doppler receiver, comprising:
   a source for generating an RF signal;
   receiver circuit means for receiving said RF signal and generating a first signal representing the elevation angle of one of said source and said receiver circuit means, a second signal representing the azimuth angle of one of said source and said receiver circuit means and a third signal representing the range of one of said source and said receiver circuit means;
   at least three antennas;
   at least three mixer circuits, each said mixer circuits connected to a respective antenna;
   an oscillator, connected to each of said mixer circuits, for heterodyning the signals from said antennas;
   at least first, second and third doppler amplifiers, each said doppler amplifier connected to a respective mixer circuit for amplifying the signal from a respective mixer circuit;
   a first phase detector, connected to said first and second doppler amplifiers, for generating said first signal;
   a second phase detector, connected to said second and third doppler amplifiers, for generating said second signal;
   a doppler counter means, connected to said third doppler amplifier, for generating said third signal.

2. A system, according to claim 1, further comprising:
   processing means, connected to said receiver circuit means, for converting said first, second and third signal into position information.

3. A system, according to claim 1, wherein said receiver circuit means, further comprises:
   automatic frequency control means, connected to said third Doppler amplifier and the respective mixer circuit thereof, and said oscillator, for controlling the frequency of said oscillator.

4. A system, according to claim 1, wherein:
   said first and second signals include electrical phase angle information.

5. A system, according to claim 1, wherein:
   said source is connected to one of a projectile and a projectile launcher; and
   said receiver circuit means is connected to the other one of the projectile and the projectile launcher;
   said first, second and third signals providing position information.

6. A system, according to claim 5, wherein:
   said projectile is a free flight launcher; and
   said projectile launcher is a free flight rocket launcher.

7. A system, according to claim 5, wherein: said projectile launcher is a gun.

8. A system, according to claim 1,
   said source is connected to one of a projectile and a projectile launcher; and
   said receiver circuit means is connected to other one of the projectile and the projectile launcher;
   said first, second and third signals providing position information.

9. A system, according to claim 8, wherein:
   said projectile is a remotely piloted aircraft.

10. A device having a combination of an RF interferometer and a Doppler receiver for receiving RF signals from the source comprising:
    a first circuit means, for receiving said RF signal and generating a first signal representing the elevation angle of one of the source and the device;
    a second circuit means, connected to said first circuit means for receiving said RF signal, for generating a second signal representing the azimuth angle of one of the source and the device and for generating a third signal representing the range of one of the source and the device;
    said first circuit means comprising first and second antennas, for receiving said RF signal;
    first and second mixer circuits connected to said first and second antennas, respectively;
    an oscillator, connected to said first and second mixer circuits, for heterodyning the signal from said first and second antennas;
    first and second Doppler amplifiers, connected to said first and second mixers circuits, respectively, for amplifying signals from a respective mixer circuit;
    first phase detector means, connected to said first and second doppler amplifiers, for generating said first signal.

11. A device, according to claim 10, further comprising:
    processing means, connected to said first and second circuit means, for converting said first, second and third signals into position information.

12. A device, according to claim 10, wherein said second circuit means, comprises:
    a third antenna, for receiving said RF signal;

a third mixer circuit, connected to said third antenna and said oscillator, for mixing the output signal from said third antenna and said oscillator;

a third Doppler amplifier, connected to said third mixer circuit, for amplifying the signal from said third mixer signal;

a second phase detector means, connected to said second and third Doppler amplifiers, for generating said second signal; and a Doppler counter means, connected to said third Doppler amplifier, for generating said third signal.

13. A device, according to claim 12, wherein said second circuit means further comprises:

automatic frequency control circuit means, connected to said third mixer, said third Doppler amplifier and said oscillator, for controlling the frequency of said oscillator.

14. A device, according to claim 10, wherein:

said first and second signals include electrical phase angle information.

15. A device, according to claim 12, wherein:

said first and second antennas are arranged relative to each other in a plane parallel to the surface of the earth; and said second and third antennas are arranged relative to each other in a plane perpendicular to the surface of the earth.

16. A target location system, having a combination of an RF interferometer and Doppler receiver, comprising:

a source for generating an RF signal;

receiver circuit means for receiving said RF signal and generating a first signal representing the elevation angle of one of said source and said receiver circuit means, a second signal representing the azimuth angle of one of said source and said receiver circuit means and a third signal representing the range of one of said source and said receiver circuit means;

at least three antennas;

at least three mixer circuits, each said mixer circuits connected to a respective antenna;

an oscillator, connected to each of said mixer circuits, for heterodyning the signals from said antennas;

at least first, second and third doppler amplifiers, each said doppler amplifier connected to a respective mixer circuit for amplifying the signal from a respective mixer circuit;

a first phase detector, connected to said first and second doppler amplifiers, for generating said first signal;

a second phase detector, connected to said second and third doppler amplifiers, for generating said second signal;

a doppler counter means, connected to said third doppler amplifier, for generating said third signal;

two of said at least three antennas are arranged relative to each other in a plane parallel to the surface of the earth; and the remaining one of said at least three antennas is arranged relative to one of the other of said at least three antennas in a plane perpendicular to the surface of the earth.

* * * * *